UNITED STATES PATENT OFFICE.

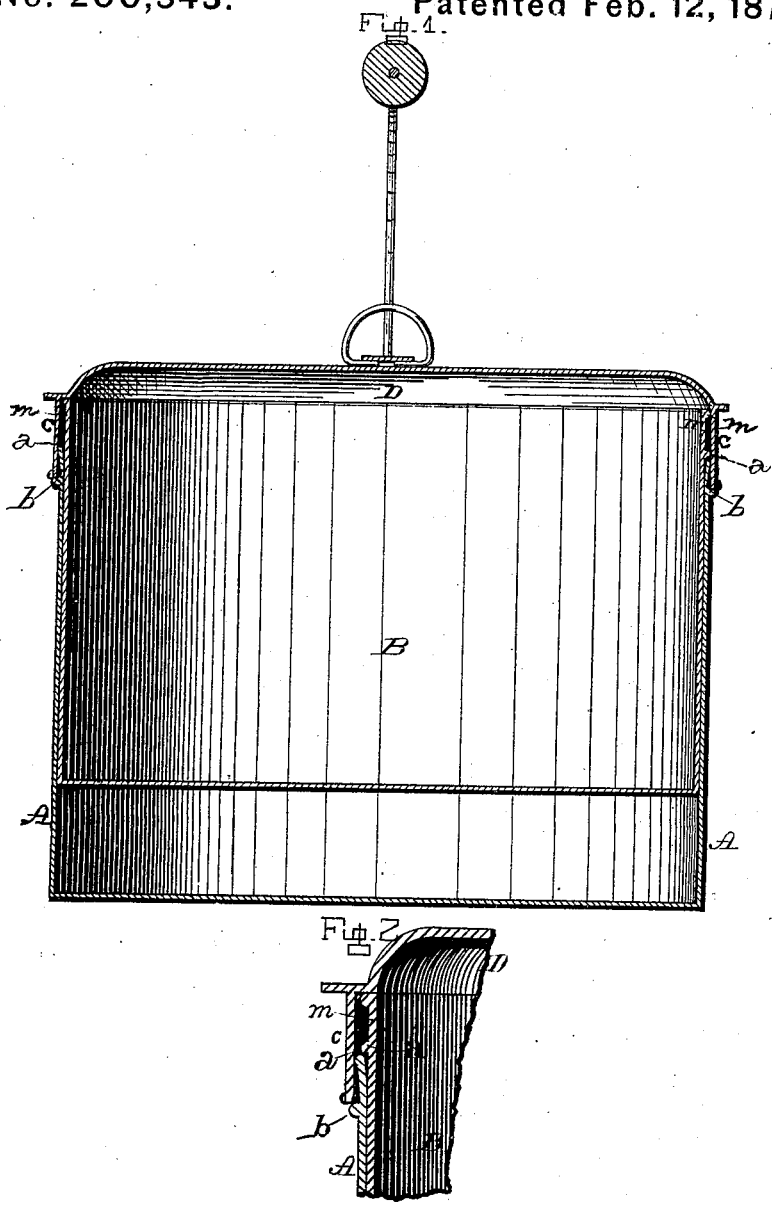

GEORGE RENSHAW, OF EAST PALESTINE, OHIO.

IMPROVEMENT IN DINNER-BUCKETS.

Specification forming part of Letters Patent No. 200,343, dated February 12, 1878; application filed January 14, 1878.

*To all whom it may concern:*

Be it known that I, GEORGE RENSHAW, of East Palestine, in the county of Columbiana and State of Ohio, have invented certain new and useful Improvements in Dinner-Buckets; and I do hereby declare the following to be a full, clear, and exact description of the invention, such as will enable others skilled in the art to which it pertains to make and use it, reference being had to the accompanying drawings, which form part of this specification.

My invention relates to an improvement in dinner-buckets; and it consists, first, in introducing into an ordinary dinner-bucket, such as is mostly used by workingmen to carry their daily dinners, an additional compartment or deck, provided near its upper edge with a swaged projection, by which it is supported upon the upper edge of the bucket; and, secondly, in making the lid or cover to pass over the outside of both bucket and deck, to rest and partly to extend over a swaged projection formed near the upper edge of the bucket, thus offering a protection against rain or dust, as will be fully described hereinafter.

Figure 1 is a vertical section of my bucket. Fig. 2 is an enlarged detail view of the same.

A represents a dinner-bucket, of cylindrical form, and similar to those commonly used by workingmen to carry their dinners when at work from home. Around the bucket, at a suitable distance from its upper edge and above the ears of the bail, is a swaged projection, $b$, for the cover to rest upon. The space between this projection and the upper edge of the bucket is a continuation of the cylinder below, so that the lid or cover may slide over it, to protect the inside and its contents. B represents a cylindrical vessel or deck. This is smaller in diameter and depth than the bucket into which it is introduced, and is provided near its upper edge with a swaged projection, $a$, which rests upon the upper edge of the bucket. The part $m$ above the projection $a$ is convenient for handling the deck, either to place it into or to lift it out of the bucket. When in place, there is room for coffee or victuals under the deck; and the projection not only prevents dust from passing in, but, when properly made, retains liquids in case of being upset. D represents the lid or cover of the bucket, the rim $c$ of which is sufficiently deep to inclose the deck and bucket as far down as the projection $b$. The lower edge of the rim $c$ is swaged and slightly bent outward, so that when the lid is placed on the bucket this edge and the projection $b$ form a guard against rain; or the lid may be made slightly larger than the bucket, so as to impinge upon the swaged projection $b$ for the same purpose.

A drinking-cup may be secured on top of the lid, and devices added to hold fork, knife, and spoon; but these I do not claim, being aware that they have been in use for a long time.

The dinner-buckets now generally in use have but one compartment, and the rims of the lids enter into this without protecting their contents against accidents or rain. It has therefore been my aim to offer a more convenient utensil by adding a second compartment, and to better secure the contents of the bucket without increasing its size.

Having thus described my invention, I claim—

The combination of the bucket A, having the projection $b$ below its upper edge, with the deck B, having the projection $a$ and space $m$, and cover D, having the flange $c$ projecting downward so as to rest upon the projection $b$, the various parts being constructed and arranged to operate substantially as set forth.

In testimony that I claim the foregoing I have hereunto set my hand and seal.

GEORGE RENSHAW. [L. S.]

Witnesses:
 JAMES HART,
 W. T. HAMILTON.